(12) United States Patent
Judkins et al.

(10) Patent No.: US 9,249,044 B2
(45) Date of Patent: Feb. 2, 2016

(54) GLASS BENDING METHOD AND APPARATUS

(75) Inventors: Zachary S. Judkins, Berkeley, CA (US); Benjamin C. Bourne, Davis, CA (US); Amine Berrada, Berkeley, CA (US)

(73) Assignee: SUNPOWER CORPORATION, San Jose, CA (US)

( * ) Notice: Subject to any disclaimer, the term of this patent is extended or adjusted under 35 U.S.C. 154(b) by 1056 days.

(21) Appl. No.: 13/324,992

(22) Filed: Dec. 13, 2011

(65) Prior Publication Data
US 2013/0000356 A1 Jan. 3, 2013

Related U.S. Application Data

(60) Provisional application No. 61/504,147, filed on Jul. 1, 2011.

(51) Int. Cl.
C03B 23/025 (2006.01)
C03B 23/00 (2006.01)
C03B 23/035 (2006.01)

(52) U.S. Cl.
CPC ......... C03B 23/0252 (2013.01); C03B 23/0026 (2013.01); C03B 23/0357 (2013.01)

(58) Field of Classification Search
CPC C03B 23/0258; C03B 33/04; C03B 23/0026; C03B 23/0252; C03B 23/0357
USPC .......................................................... 65/107
See application file for complete search history.

(56) References Cited

U.S. PATENT DOCUMENTS

| 2,131,873 | A | * | 10/1938 | Goodwillie ..................... 65/268 |
| 2,932,129 | A | * | 4/1960 | Alexander et al. .............. 65/105 |
| 4,153,474 | A | | 5/1979 | Rex |
| 4,323,719 | A | | 4/1982 | Green |
| 4,373,783 | A | | 2/1983 | Anderson |
| 4,456,332 | A | | 6/1984 | Anderson |
| 4,468,848 | A | | 9/1984 | Anderson et al. |

(Continued)

FOREIGN PATENT DOCUMENTS

| DE | 10041271 | 3/2002 |
| DE | 202004005198 | 8/2004 |

(Continued)

OTHER PUBLICATIONS

Bardwell, Karen et al., "Minimizing End Shadowing Effects on Parabolic Concentrator Arrays," IEEE, 1980, pp. 765-770.

(Continued)

*Primary Examiner* — Richard Crispino
*Assistant Examiner* — Yana B Krinker
(74) *Attorney, Agent, or Firm* — Knobbe, Martens, Olson & Bear LLP

(57) ABSTRACT

A sag-bending glass mold for creating a partial parabolic-curved glass sheet is disclosed. The glass mold comprises a glass-support surface having a cross-sectional profile of varying height. The cross-sectional profile has a first portion with profile of a non-parabolic, linear-square root composite shape. A method for forming a partial parabolic glass sheet is also disclosed. The method comprises positioning a planar glass sheet on a sag-bending mold having a linear-square root composite shape and deforming the glass sheet to follow the linear-square root composite shape of the sag-bending mold.

12 Claims, 9 Drawing Sheets

(56) References Cited

U.S. PATENT DOCUMENTS

| | | | |
|---|---|---|---|
| 4,468,849 A | 9/1984 | Anderson et al. |
| 4,481,378 A | 11/1984 | Lesk |
| 4,502,200 A | 3/1985 | Anderson et al. |
| 4,640,734 A | 2/1987 | Roberts et al. |
| 4,643,543 A | 2/1987 | Mohn et al. |
| 4,643,544 A | 2/1987 | Loughran |
| 4,759,803 A | 7/1988 | Cohen |
| 5,180,441 A | 1/1993 | Cornwall et al. |
| 5,248,346 A | 9/1993 | Fraas et al. |
| 5,334,496 A | 8/1994 | Pond et al. |
| 5,344,496 A | 9/1994 | Stern et al. |
| 5,389,158 A | 2/1995 | Fraas et al. |
| 5,409,549 A | 4/1995 | Mori |
| 5,498,297 A | 3/1996 | O'Neill et al. |
| 5,580,395 A | 12/1996 | Yoshioka et al. |
| 5,616,185 A | 4/1997 | Kukulka |
| 5,660,644 A | 8/1997 | Clemens |
| 5,697,192 A | 12/1997 | Inoue |
| 5,865,905 A | 2/1999 | Clemens |
| 5,899,199 A | 5/1999 | Mills |
| 5,990,415 A | 11/1999 | Green et al. |
| 6,034,322 A | 3/2000 | Pollard |
| 6,131,565 A | 10/2000 | Mills |
| 6,323,478 B1 | 11/2001 | Fujisaki et al. |
| 6,359,209 B1 | 3/2002 | Glenn et al. |
| 6,442,937 B1 | 9/2002 | Stone |
| 6,553,729 B1 | 4/2003 | Nath et al. |
| 6,635,507 B1 | 10/2003 | Boutros et al. |
| 7,468,485 B1 | 12/2008 | Swanson |
| 7,554,031 B2 | 6/2009 | Swanson et al. |
| 7,709,730 B2 | 5/2010 | Johnson et al. |
| 7,820,906 B2 | 10/2010 | Johnson et al. |
| 7,825,327 B2 | 11/2010 | Johnson et al. |
| 7,932,461 B2 | 4/2011 | Johnson et al. |
| 7,952,057 B2 | 5/2011 | Finot et al. |
| 7,968,791 B2 | 6/2011 | Do et al. |
| 8,039,777 B2 | 10/2011 | Lance et al. |
| 8,049,150 B2 | 11/2011 | Johnson et al. |
| 8,071,930 B2 | 12/2011 | Wylie et al. |
| 8,083,362 B2 | 12/2011 | Finot et al. |
| 2002/0116953 A1* | 8/2002 | Yli-Vakkuri .................. 65/273 |
| 2003/0154746 A1 | 8/2003 | Lammi et al. |
| 2004/0074490 A1 | 4/2004 | Mills et al. |
| 2006/0010916 A1 | 1/2006 | Leclercq et al. |
| 2007/0039354 A1 | 2/2007 | Ollfisch et al. |
| 2007/0151598 A1 | 7/2007 | De Ceuster et al. |
| 2007/0257274 A1 | 11/2007 | Martter et al. |
| 2008/0035198 A1 | 2/2008 | Teppe et al. |
| 2009/0056699 A1 | 3/2009 | Mills et al. |
| 2009/0056785 A1 | 3/2009 | Johnson et al. |
| 2009/0056786 A1 | 3/2009 | Johnson et al. |
| 2009/0056787 A1 | 3/2009 | Johnson et al. |
| 2009/0095284 A1 | 4/2009 | Klotz |
| 2009/0139557 A1 | 6/2009 | Rose et al. |
| 2010/0154788 A1 | 6/2010 | Wells et al. |
| 2010/0163014 A1 | 7/2010 | Johnson et al. |
| 2010/0175740 A1 | 7/2010 | Johnson et al. |
| 2010/0193014 A1 | 8/2010 | Johnson et al. |
| 2010/0236626 A1 | 9/2010 | Finot et al. |
| 2010/0294336 A1 | 11/2010 | Johnson et al. |
| 2010/0319682 A1 | 12/2010 | Klotz |
| 2011/0023940 A1 | 2/2011 | Do et al. |
| 2011/0132457 A1 | 6/2011 | Finot |
| 2011/0186130 A1 | 8/2011 | Finot et al. |
| 2011/0226309 A1 | 9/2011 | Do et al. |
| 2011/0226310 A1 | 9/2011 | Johnson et al. |
| 2011/0265869 A1 | 11/2011 | Finot et al. |

FOREIGN PATENT DOCUMENTS

| | | |
|---|---|---|
| GB | 2340993 | 3/2000 |
| JP | 10-059733 | 3/1998 |
| JP | 2007184542 | 7/2007 |
| JP | 2007194521 | 8/2007 |
| JP | 2007214247 | 8/2007 |
| KR | 2000-0200398 | 10/2000 |
| KR | 1020070070183 | 7/2007 |
| KR | 1020090014153 | 2/2009 |
| WO | WO9957493 | 11/1999 |
| WO | WO2007096157 | 8/2007 |
| WO | WO2007096158 | 8/2007 |
| WO | WO2008022409 | 2/2008 |
| WO | WO2008153922 | 12/2008 |
| WO | WO2009023063 | 2/2009 |
| WO | WO2009029275 | 3/2009 |
| WO | WO2009029277 | 3/2009 |

OTHER PUBLICATIONS

Carroll, Don et al. "Production of the Alpha Solarco Proof-of-Concept Array," IEEE, 1990, pp. 1136-1141.

Edenburn, Michael W., et al. "Shading Analysis of a Photovoltaic Cell String Illuminated by a Parabolic Trough Concentrator," IEEE, 1981, pp. 63-68.

Quagan, Robert J., "Laser Diode Heat Spreaders," Ion Beam Milling, Inc., website copyright 2010, http://www.ionbeammilling.com/default.asp, 9 pgs.

Shepard, Jr., N. F. et al., "The Integration of Bypass Diodes with Terrestrial Photovoltaic Modules and Arrays," IEEE, 1984, pp. 676-681.

Stern, T. G., "Interim results of the SLATS concentrator experiment on LIPS-II (space vehicle power plants)," Photovoltaic Specialists Conference, 1988., Conference Record of the Twentieth IEEE , vol., No., pp. 837-840 vol. 2, 1988. URL: http://ieeexplore.ieee.org/stamp/stamp.jsp?tp=&arnumber=105822&isnumber=3239.

Vivar Garcia, Marta, "Optimisation of the Euclides Photovoltaic Concentrator," 2009, 390 pages.

International Search Report and Written Opinion received in International Patent Application No. PCT/US2012/044612, dated Jan. 31, 2013, filed on Jun. 28, 2012; in 13 pages.

Chilean Office Action issued in Chilean Application No. 3613-2012, mailed Sep. 26, 2015, in 11 pages.

* cited by examiner

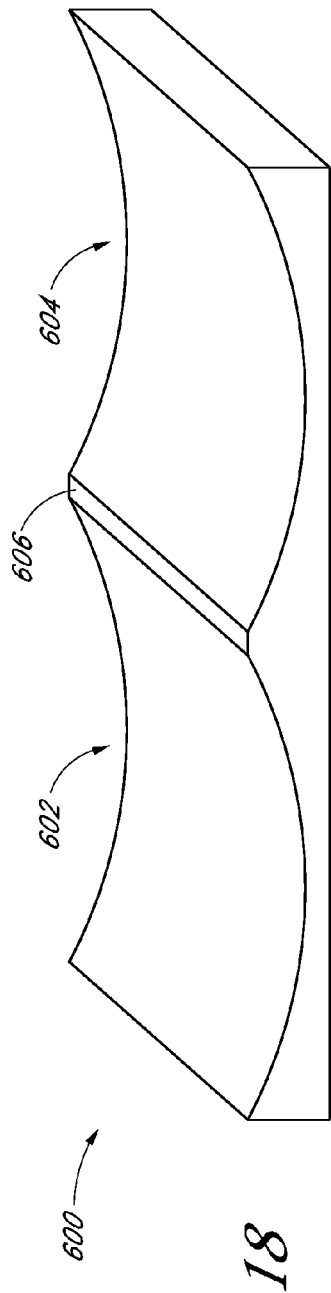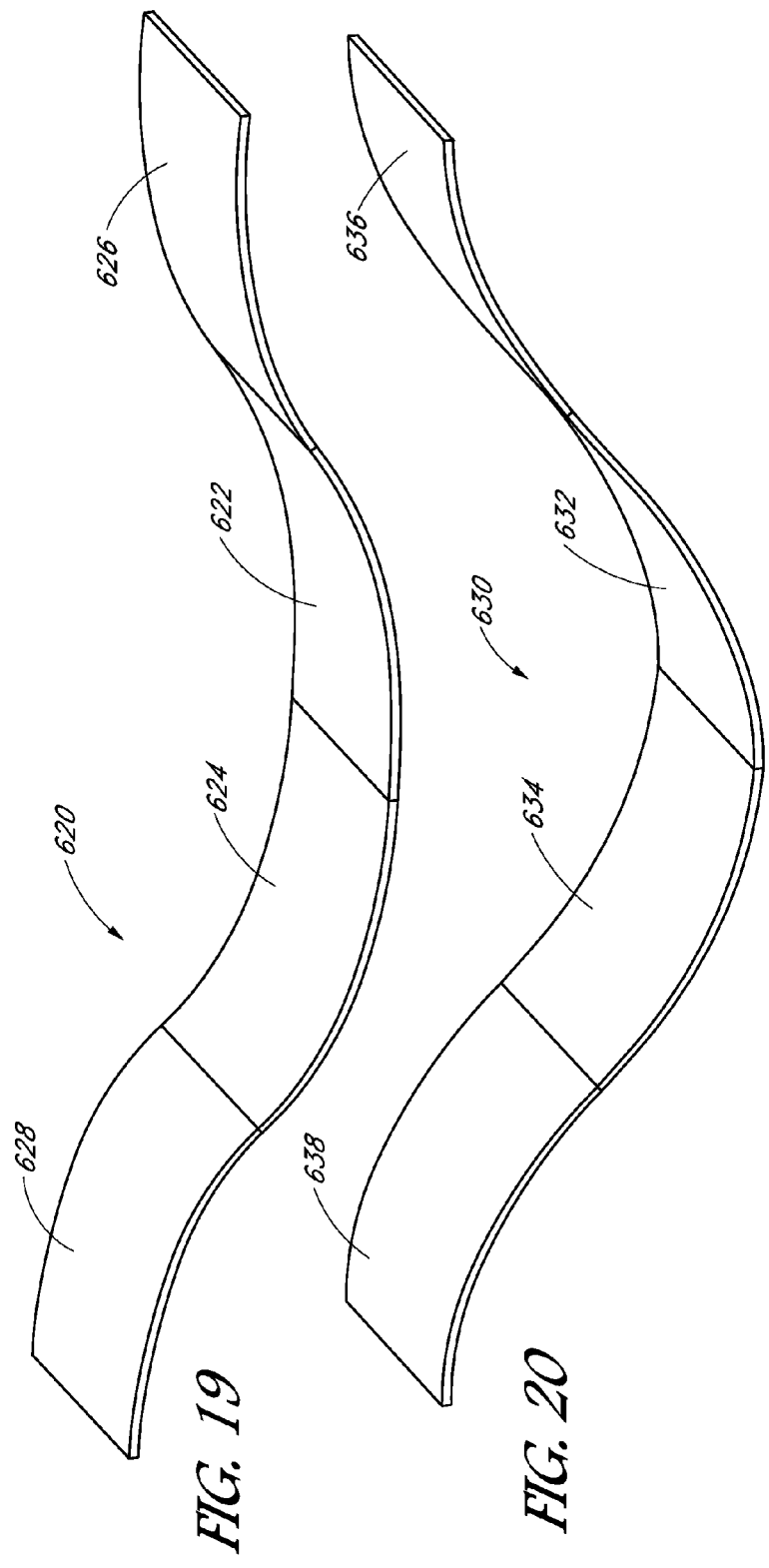
FIG. 18
FIG. 19
FIG. 20

GLASS BENDING METHOD AND APPARATUS

PRIORITY INFORMATION

The present Application claims priority under 35 U.S.C. §120 to U.S. Provisional Patent Application No. 61/504,147, filed Jul. 1, 2011, the entire contents of which is hereby incorporated by reference.

TECHNICAL FIELD

Embodiments of the subject matter described herein relate generally to forming of curved glass sheets. More particularly, embodiments of the subject matter relate to sag-bending deformation of glass sheets.

BACKGROUND

Glass mirrors, including those with a parabolic shape, are useful for solar applications. In some solar applications, parabolic-shaped mirrors can be used for solar concentrator systems. A solar concentrator system is one where sunlight is reflected with increased, concentrated intensity on a receiving unit. Because of the optical effects associated with parabolic-shaped mirrors, such shapes are useful for focusing concentrated sunlight.

Forming parabolic mirrors can be accomplished through sag-bending techniques. There are challenges associated with forming parabolic-shaped glass mirrors with sag bending. For example, it can be challenging to form a parabolic-shaped glass sheet because the curve deviation from a flat sheet of glass increases as the length of the glass sheet increases. Thus, longer mirrors have portions that are deformed a small amount and a greater amount. The dissimilarity in deformation amounts can cause increased difficulty in accurately controlling the shape of the glass sheet during deformation.

Solar concentrator systems can be sensitive to minor variations in operating conditions, such as mirror shape, which can affect the location of concentrated sunlight on the receiving unit, the shape of the concentrated sunlight reflected area, and other aspects of the system, all of which contribute to the efficiency and power output of the system. Accordingly, solar concentrator systems benefit from components made to very high precision. Thus, crafting parabolic mirrors with minimized defects or deviations from an ideal shape provides a benefit to a solar concentrator system.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 18 is another embodiment of a sag-bending glass mold having a linear-square root composite shape;
FIGS. 19 and 20 are different embodiments of sag-bending glass molds having joined linear-square root composite shapes.

DETAILED DESCRIPTION

Figure 1:
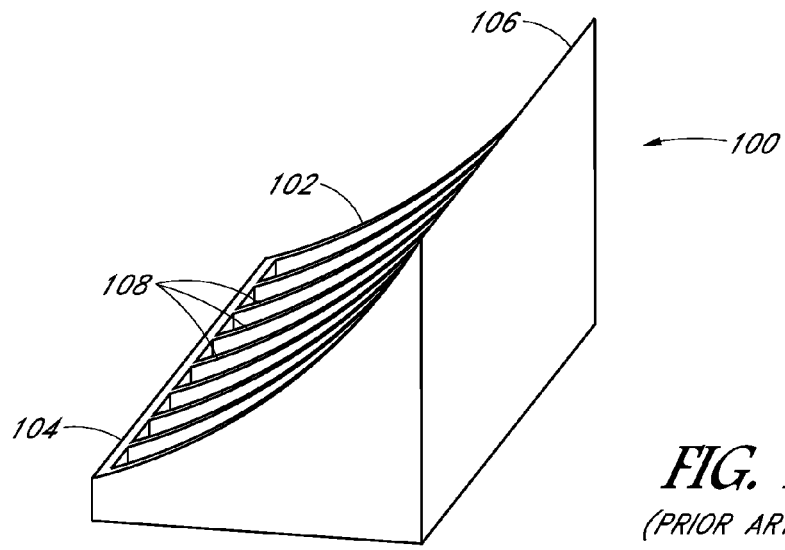
FIG. 1 is an illustration of a parabolic glass mold.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

A partial parabolic shape, that is, a portion or segment of a parabola, is a desirable for use in some embodiments of solar concentrator applications. When used herein the glass referred to can be used for creating a mirror, as would be used in a reflector element of a solar concentrator.

A glass sheet can be processed to create a mirror sheet through the addition of a reflective layer to an exposed surface of the glass sheet, or by embedding a reflective layer between glass sheets. Such processing can include the metallization of a surface of the glass, including deposition of successive metal layers, including tin, silver, copper, and other metals, to produce a reflective layer. In some mirrors, the reflectivity is uni-directional.

Regardless, when described herein the glass sheets described can, in some embodiments, be later processed to produce mirrors, including mirrors appropriate for concentrating photovoltaic or concentrating solar thermal applications. In certain embodiments, the glass sheets can comprise one or more reflective surfaces before the bending techniques described herein are applied. Thus, while reference is sometimes made to embodiments for bending glass sheets, it should be understood that bending the glass sheet to produce a curved glass sheet can also describe a process for bending a glass sheet with a reflective surface to produce a curved mirror. Additional process steps, such as laminating or polishing may also be used to produce a completed mirror from a curved glass sheet without deviating from the advances described herein.

Common industry practice is to form a desired curved shape by sag-bending a flat sheet of glass (or other material) either to form an entire parabola, which includes the shaping of wasted segments of the parabola, or to form the partial parabolic shape in its original orientation as extending from an imaginary origin of the parabolic shape. The former approach is expensive in that it wastes glass. The latter approach is challenging to mold from a flat sheet of glass because the parabolic shape deviates an increasing amount from a flat shape the longer the parabola extends. Forming the curved shape from a flat glass sheet requires differing deformation amounts and therefore different heating amounts, all of which are challenging and costly.

Additionally, concentrator glass sheets can be wider than they are long, sometimes having an aspect ratio of 5:1 or greater. This aspect ratio introduces additional challenges because high-aspect ratio glass sheets do not easily sag at the differing amounts required by a partial parabolic shape. It is preferable to have a lower aspect ratio for more uniform sag-bending.

To reduce cost and simplify manufacture, the inventors have discovered that it is possible to form a partial parabolic shape from a non-parabolic-shaped mold. Additionally, the non-parabolic shape can have one side with a flat edge. Multiple non-parabolic shapes can be molded by joining the flat edges, thereby decreasing the aspect ratio of the molded glass. Further, this can be accomplished with little to no waste glass, and while simultaneously increasing manufacturing throughput. The advantageous end result is that partial parabolic curved glass sections can be formed with lower cost, greater simplicity, and at a faster rate, than previously possible.

Figure 2:
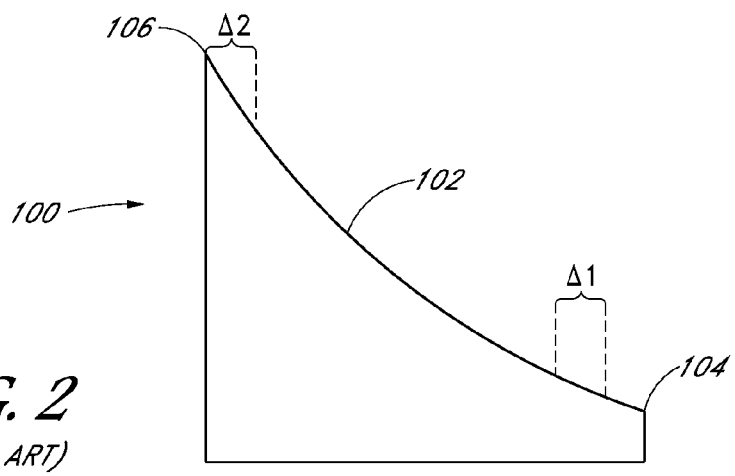
FIG. 2 is a side view of the parabolic glass mold of FIG. 1.

FIG. 1 illustrates a typical mold 100 for forming a parabolic glass sheet as used in the art. The mold 100 has an upper surface 102 which can be solid or distributed across several longitudinal or lateral rib portions. The mold 100 has a cross-sectional shape as shown in FIG. 2. With reference to both FIGS. 1 and 2, the mold 100 can be considered to have an origin 104 and an upper point 106. The parabolic shape of the upper surface 102 is used to form the shape of a curved glass segment when flat glass is heated to sag bend onto it. Typical molds, such as mold 100, are constructed to form a single parabolic shape for use in molding a single glass sheet.

As can be seen in FIG. 2, two portions of the curved upper surface 102 are identified as $\Delta 1$ and $\Delta 2$. $\Delta 1$ indicates an area near the imaginary origin 104, whereas $\Delta 2$ indicates a region further from the origin 104. As can be seen, and is true for parabolic shapes, the rate of change of the curved upper surface 102 from a flat vertical shape is significantly higher in the region of $\Delta 2$ than in $\Delta 1$. When sag-bending a flat glass sheet, the temperature to which the glass sheet must be heated increases corresponding to the amount of deflection from the flat shape that the glass will be curving. Thus, a shallow curved shape can be formed at a lower temperature than a deeply-curved shape. Additionally, it is desirable to have as little variance between different portions of the curved shape's depth as possible to promote uniform heating and uniform bending. Finally, it is desirable to form as shallow a curve as possible to reduce localized deformation in the glass sheet beyond sheet bending.

It should be noted that the scale and proportion of all figures is for descriptive purposes only, and should not be considered for actual measurements. Additionally, exaggerations for clarity may be used when necessary. For example, the rates of curvature of regions near $\Delta 1$ and $\Delta 2$ may in fact be much less than illustrated, but shown thus for descriptive purposes. Notwithstanding such alterations, the manufacturing difficulties described may still be present even for smaller differences in rates of curvature.

When sag-bending a flat glass sheet onto the upper surface 102, the glass sheet will need a greater amount of heat in the region near $\Delta 2$ than near $\Delta 1$. Additionally, because of the slope of curvature of the region near $\Delta 2$, some localized deformation in the glass may occur in addition to bending from a flat shape to match the curve of the upper surface 102. These considerations increase manufacturing complexity and cost.

Figure 3:
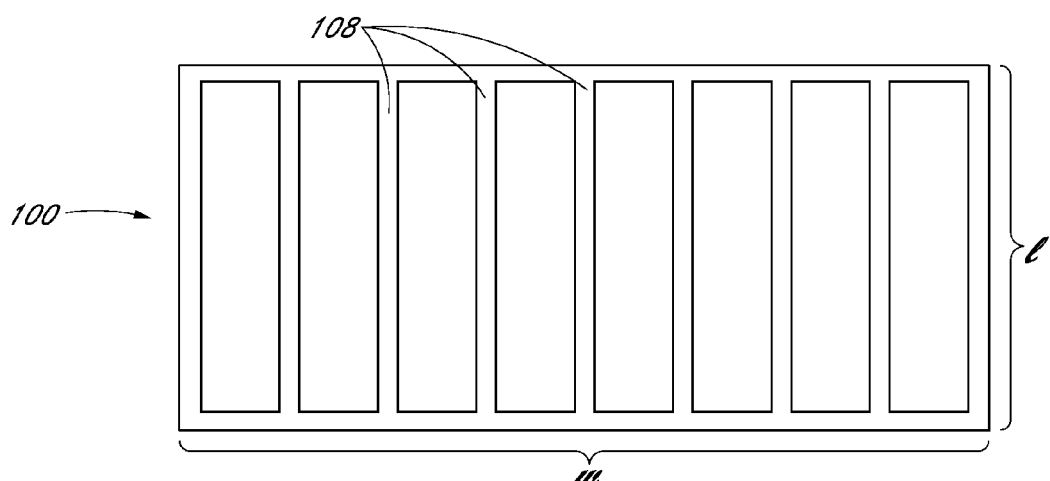
FIG. 3 is a top view of the parabolic glass mold of FIG. 2.

FIG. 3 illustrates a top view of the mold 100. This view permits display of the relative width w and length l. The ratio of w to l forms the aspect ratio. For solar concentrator applications, the ratio, as can be seen, although not to scale, can be as high as 3:1 or greater. This high aspect ratio additionally complicates manufacture.

Figure 4:
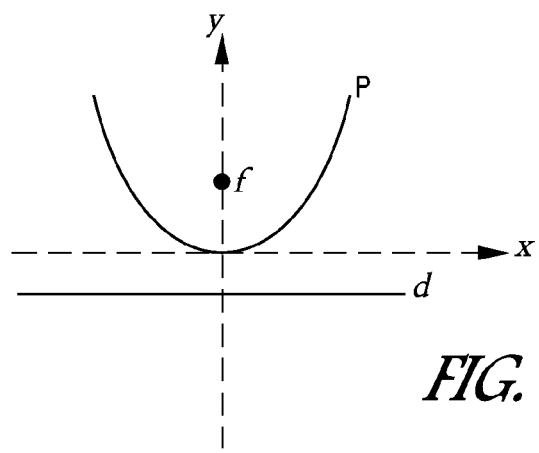
FIG. 4 is an illustration of a parabola.

FIG. 4 illustrates a parabola P. A parabola is a conic section and in a plane is the locus of points that are equidistant between a point focus and a line directrix. In the illustration of FIG. 4, the parabola P is formed in relation to the focus f and directrix d. Coordinate axes x and y are provided for reference. Although the focus f is used for illustrative purposes, it should not be confused with the focus of the finished mirror or curved glass used in solar concentrating applications, whether thermal or photovoltaic, or otherwise benefiting from the glass produced. Additionally, as used throughout, a parabola refers to such a shape as illustrated here, and parabolic is used to describe shapes having properties associated with the shape.

A parabola formed with symmetry about the y-axis, such as parabola P, can be expressed by the mathematical formula:

$$P(x) = ax^2 + bx + c;$$

where a, b, and c represent constants. Such a parabola is useful for solar concentrator applications for certain values of the constants. As mentioned above, however, for practical reasons, it is a partial parabolic shape that can also be used for solar concentrator applications. One such shape that can be used is:

$$P_1(x) = 0.001192x^2 + 0.109046544x$$

Figure 5:
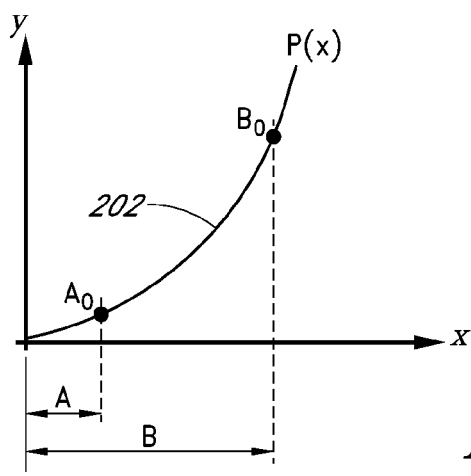
FIG. 5 is an illustration of another parabola with a designated section.

FIG. 5 illustrates a portion 202 of parabola P between points $A_0$ and $B_0$. Point $A_0$ corresponds to the point of the parabola P a distance A from the origin and with a height from the origin of P(A). Thus, (A, P(A)) is the point $A_0$. Similarly, point $B_0$ is the point of the parabola P that is a distance B from the origin and has a height of P(B).

Portion 202 represents a partial parabolic shape that can be used in a solar concentrator application. It can be inefficient, however, to form the entire parabola P from (0, P(0)) to (B, P(B)), subsequently discarding the portion of parabola P between (0, P(0)) and (A, P(A)), to obtain portion 202 for use in a solar concentrator. This is the approach typically used by mold 100, such that the origin 104 corresponds to the point (0, P(0)) and the upper point 106 corresponds to the point (B, P(B)). For one such portion 202 corresponding to the exemplary parabola $P_1(x)$, the portion can be between 45.791 and 483.241 on the x axis.

Figure 6:
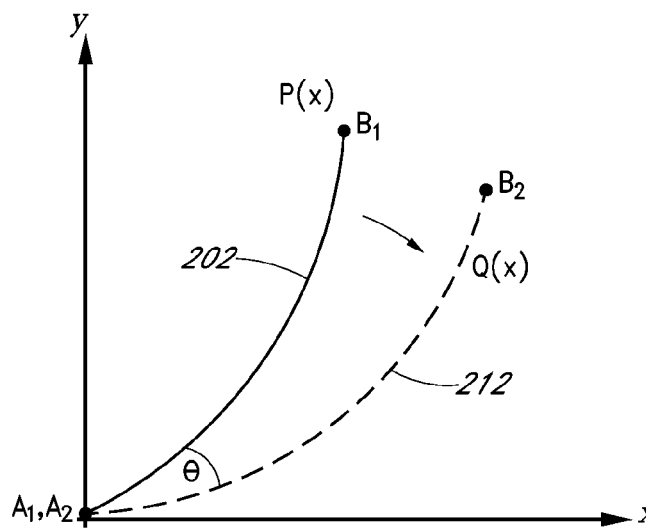
FIG. 6 is an illustration of the designated section of FIG. 5 and transformed section.

FIG. 6 illustrates the discovery by the inventors that portion 202 can be transformed into portion 212 for simplification of manufacture at reduced cost and increased throughput. The inventors have discovered that portion 202 can be translated such that point (A, P(A)) is located at the origin. Thus, as shown in FIG. 6, point $A_0$ has been translated to point $A_1$ located at (0, 0). Point $B_0$ is altered by translation to point $B_1$. By itself, this translation reduces the waste associated with forming portion 202. The slope of the portion 202 as it approaches the origin (0, 0) does not approach a horizontal, or zero slope. Put another way, the tangent of P(x) does not approach zero as P(x) approaches the origin from the positive x direction. This can make manufacture challenging.

The inventors have further discovered that P(x) and corresponding portion 202 can be rotated downward by a negative angle θ to produce Q(x) and corresponding portion 212. The negative angle θ is defined as the angle necessary to rotate portion 202 such that the slope of 202 approaches zero as Q(x) approaches the origin from the positive x direction. The value of θ varies as the parabola P(x) varies, but can be anywhere from 0.01 to 90 degrees, whether measured negatively or positively.

After rotating P(x) and portion 202 to achieve curve Q(x) and portion 212, the point $A_1$ is still located at the origin and indicated by point $A_2$. Point $B_1$ has been moved by the rotation of portion 202 to be located at new point $B_2$. Portion 212 can be described by the curve Q(x). Whereas P(x) was described by the parabolic formula above for symmetry about the y axis, Q(x) is no longer a parabolic curve, but instead can be described by the formula:

$$Q(x) = dx + ((\sqrt{(ex+f)})/g) + h;$$

where d, e, f, g, and h are constants. The shape of the curve of Q(x) is referred to as a linear square root composite shape. The values of a, b, and c associated with parabola P(x) determine the value of negative angle θ and both determine the values of constants d, e, f, g, and h. Accordingly, the exact shape of curve Q(x) will be determined by the shape of parabola P(x) desired for the embodiment. The calculation of x' and Q(x'), where x' corresponds to the x coordinate of a point on the curve (x, P(x)), and Q(x') corresponds to the y coordinate, is performed by the use of a rotation matrix [R] on P(x) such that:

$$\begin{bmatrix} x' \\ Q(x') \end{bmatrix} = \begin{bmatrix} \cos\theta & -\sin\theta \\ \sin\theta & \cos\theta \end{bmatrix} \begin{bmatrix} x \\ P(x) \end{bmatrix}$$

To produce a $Q_1(x)$ that would correspond to $P_1(x)$, the following constants are present:

| | |
|---|---|
| d | = 9.170396 |
| e | = 0.00052 |
| f | = 1.011891 |
| g | = 0.0000280154 |
| h | = 35906.3 |

Such constants correspond to the fact that $P_1(x)$ must be rotated by a negative angle θ approximately equal to 6.22° to achieve the linear square root composite curve $Q_1(x)$. Put another way, $P_1(x)$ must be rotated approximately 6.22° clockwise, toward the positive x axis, to achieve curve $Q_1(x)$. The values of a, b, and c associated with parabola P(x), along with the end points of interest, such as examples $A_0$ and $B_0$, necessarily determine the value of negative angle θ and both necessarily determine the values of constants d, e, g, and h. Accordingly, the exact shape of curve Q(x) will be determined by the shape of parabola P(x) and the selected endpoints desired for the embodiment. Therefore, for every portion of a parabola P(x), such as portion 202, there will exist exactly one transformed portion of a linear square root composite shaped curve, such as portion 212, of Q(x). Portion 212 corresponds exactly to the curvature of portion 202, except that is has been translated and rotated from the original illustration in FIG. 5.

Thus, a sag-bending mold which is used to fabricate portion 212, having the curved shape of portion 212, will produce a curved portion of glass which matches the curve of portion 202. The portion 212 is advantageously simpler, faster, and less complex to manufacture than portion 202 or parabola P(x), greatly reducing cost. Accordingly, the non-parabolic shape of the linear square root composite curved shape can be used to create, by molding for example, a partial parabolic curve shape that previously could only be formed by using a parabolic shaped mold. A non-parabolic surface on a mold can therefore be used to produce a partial parabolic shaped glass surface after sag-bending molding. All references to parabolic and non-parabolic shapes are made with respect to the original defined coordinate references in which the parabola is first described.

Figure 7:
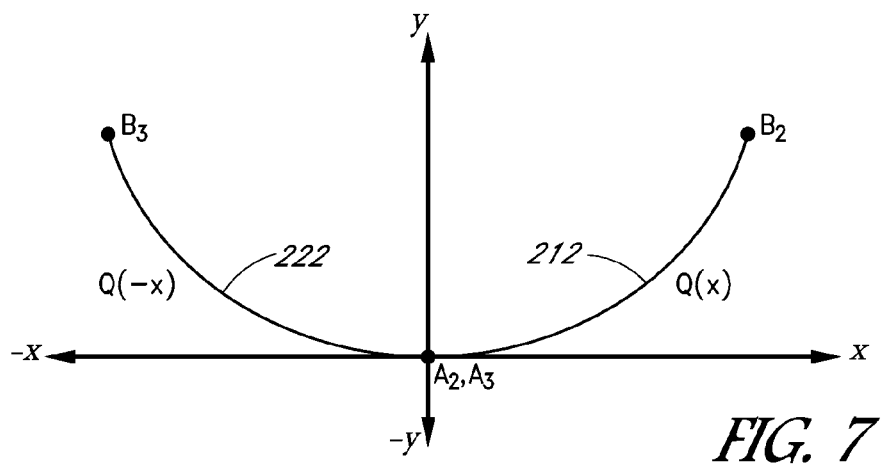
FIG. 7 is an illustration of an embodiment of a linear-square root composite shape.

FIG. 7 illustrates that further improvement can be possible by taking advantage of the zero-slope at endpoint $A_2$ by rotating the portion 212 around the y axis to obtain portion 222. Portions 212 and 222 have overlapping endpoints $A_2$ and $A_3$ at the origin. Endpoint $B_2$ of portion 212 is at the same place as calculated above and illustrated with respect to FIG. 6. Endpoint $B_3$ of portion 222 has the same height as $B_2$ while extending in the negative x direction an equal distance from the origin as $B_2$ is in the positive x direction, as illustrated. Thus, portions 212 and 222 can meet smoothly at the origin with a zero slope and form a double-wide joined portion. Each half, if divided at the y axis forms a partial parabolic shape of the type illustrated in FIG. 5 and desired for solar concentrator systems.

Figure 8:
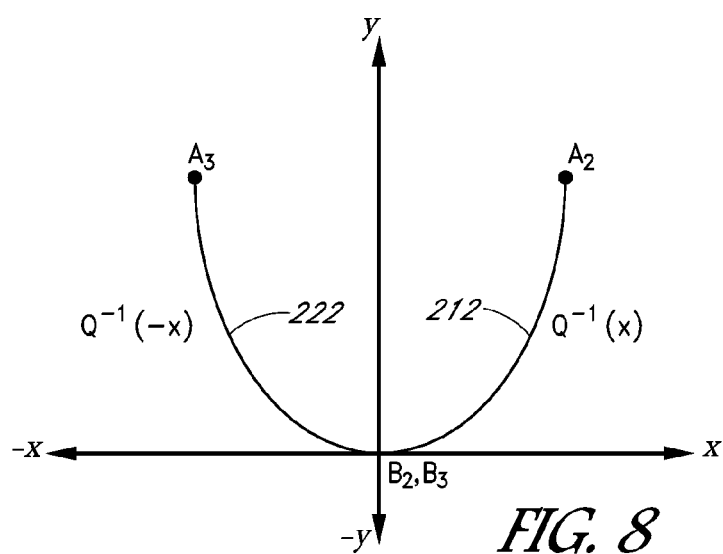
FIG. 8 is another illustration of an embodiment of a linear-square root composite shape.

FIG. 8 illustrates an inversion pairing of portion 212. As can be seen, the portion 212 has been further rotated such that endpoint $B_2$ is now positioned at the origin and portion 212 has been oriented such that the curve, which is the inverse or $Q^{-1}(x)$ of Q(x), still has a zero slope, or horizontal tangent, at the origin as $Q^{-1}(x)$ approaches the origin from the positive x direction. Accordingly, endpoint $A_2$ now is positioned at the upper right end of the portion 212. As previously stated, it should be noted that while portion 212 appears to have a shallower upward slope in FIG. 7 than in FIG. 8, and the inversion of curve Q(x) in FIG. 8 has produced a sharper upward slope, in actual practice, the reverse may be true, and all illustrated elements are shown for descriptive purposes. Accordingly, such features may not be to scale for purposes of clarity of description.

Rotating the inverted portion 212 of FIG. 8 produces portion 222 which has a similar positioning of end points $A_3$ and $B_3$ as mirrored across the y axis. Depending on the shape of curve Q(x), it may be more advantageous to construct a mold having an upper surface with the shape of joined portions 212 and 222 resembling FIG. 7 or the inverted embodiment illustrated in FIG. 8.

Figure 9:
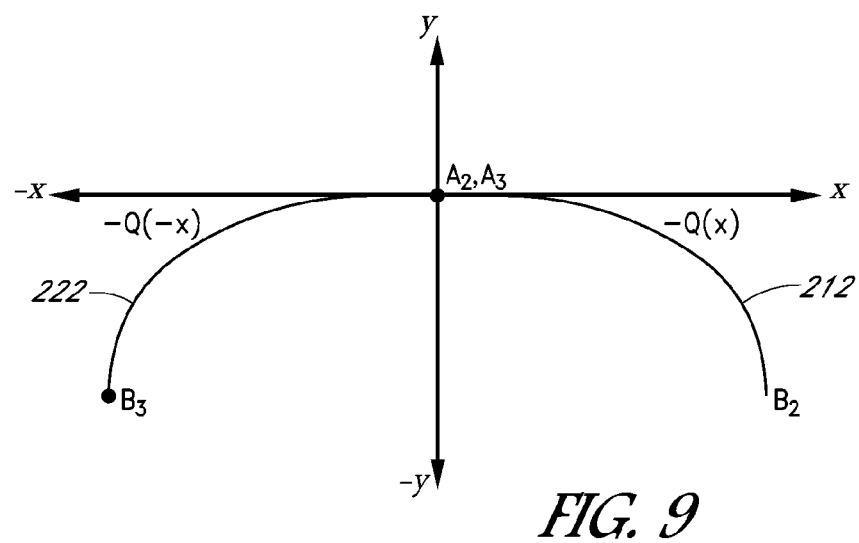
FIG. 9 is yet another illustration of an embodiment of a linear-square root composite shape.

FIG. 9 illustrates yet another embodiment of a variation of FIG. 7 where portions 212 and 222 have been rotated about the x axis. Thus, while the endpoints $A_2$ and $A_3$ remain at the origin, the curves extend in the negative y direction as they extend outward from the origin. Such a rotation can also be performed on the embodiment shown in FIG. 8, producing downward curves of the illustrated inverted portions 212, 222 of FIG. 8. In all instances where portion 222 is formed by rotating portion 212 about an axis or line, portion 222 is said to be the mirror image of portion 212.

Any of the shapes of FIGS. 6-9, or other variations thereof, can be used to form a mold for sag-bending a flat glass sheet into the partial parabolic shape desired. Several of the shapes will produce multiple partial parabolic curved sections or segments, such as the shape illustrated in FIG. 7 or 8, which can then be separated, divided, or cut into the desired part for use.

Figure 10:
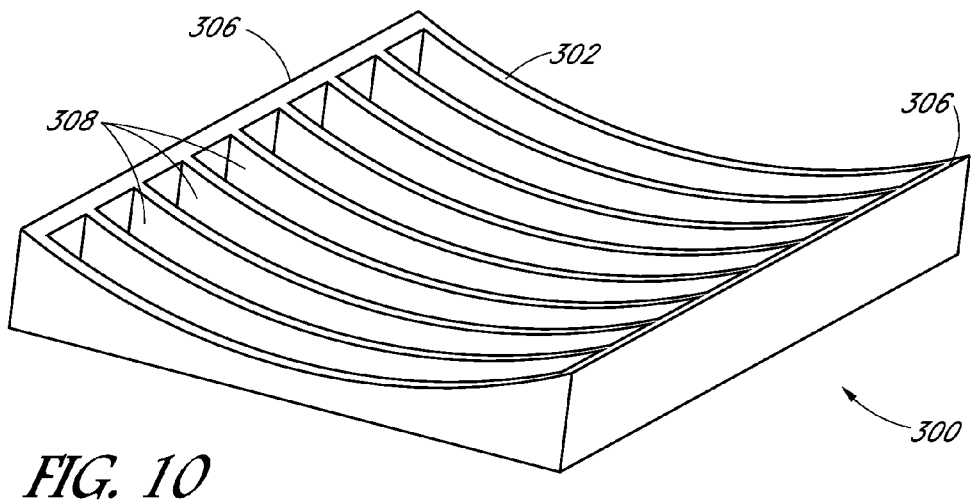
FIG. 10 is an embodiment of a sag-bending glass mold having a linear-square root composite shape.

FIG. 10 illustrates an improved mold 300 for use in forming partial parabolic shaped glass sections formed by sag-bending. The mold 300 can be a perimeter-support mold with a plurality of ribs 308 forming an upper surface 302. In certain embodiments, the mold 300 can be formed as a solid component with a single upper surface, while in other embodiments, the upper surface can be distributed across multiple components, such as internal longitudinal or lateral ribs. The mold 300 of FIG. 10 illustrates longitudinal ribs 308 which extend between the two outer edges 306 of the mold 300. The ribs 308 can be any thickness or width as desired for operation of the mold 300.

Figure 11:
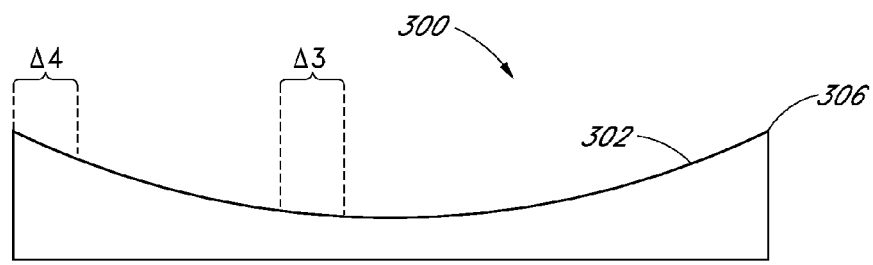
FIG. 11 is a side view of the sag-bending glass mold of FIG. 10.

With additional reference to FIG. 11, the mold 300 is shown from the side, illustrating the cross-section of the upper surface 302, which has a variable height. It should be noted that mold 300 has been simplified for descriptive purposes. Some embodiments of the mold 300 can include ports and inlets and outlets for gas venting and vacuum, as well as clips, gutters, heating features, and any other appropriate components for use in a sag-bending mold, including a perimeter-supported sag-bending mold.

The upper surface 302 has outer edges 306. The mold 300 can have an upper surface 302 with a linear square root composite curved shape, in accordance with the shapes and their variations as described above. Thus, the mold 300 can have a shape similar to that illustrated in FIG. 7, where points $A_2$ and $A_3$ would lie at the midpoint of the upper surface 302, approximating the origin of FIG. 7, and points $B_2$ and $B_3$ would correspond to the points of the upper surface 302 at the outer edges 306. The upper surface 302 can also be reduced or increased in scale as desired, such for a negative or positive mold. Such a surface as the upper surface 302 can be continuous or spread across any ribs 308 of the mold 300.

FIG. 11 additionally includes regions marked Δ3 and Δ4, similar to the respective marked regions Δ1 and Δ2 of FIG. 2, described above. Each indicator references the same portion of the upper surface of the respective mold 100, 300. Because of the rotation of the linear square root composite shape, it should be noted that Δ3, which references a position similar to that referenced by Δ1 has a shallower curve than Δ1. Δ4 references a position similar to that of Δ2. Similarly, and again because of the rotation by negative angle θ of the curved mold 300 as compared to the parabolic mold 100, Δ4 is shallower than Δ2. Thus the improved curve of mold 300 can reduce local deformation during sag bending as compared to a parabolic mold 100. Additionally, the reduced disparity between Δ3 and Δ4, as compared to between Δ1 and Δ2 correspondingly reduces manufacturing complexity and, hence, cost.

Figure 12:
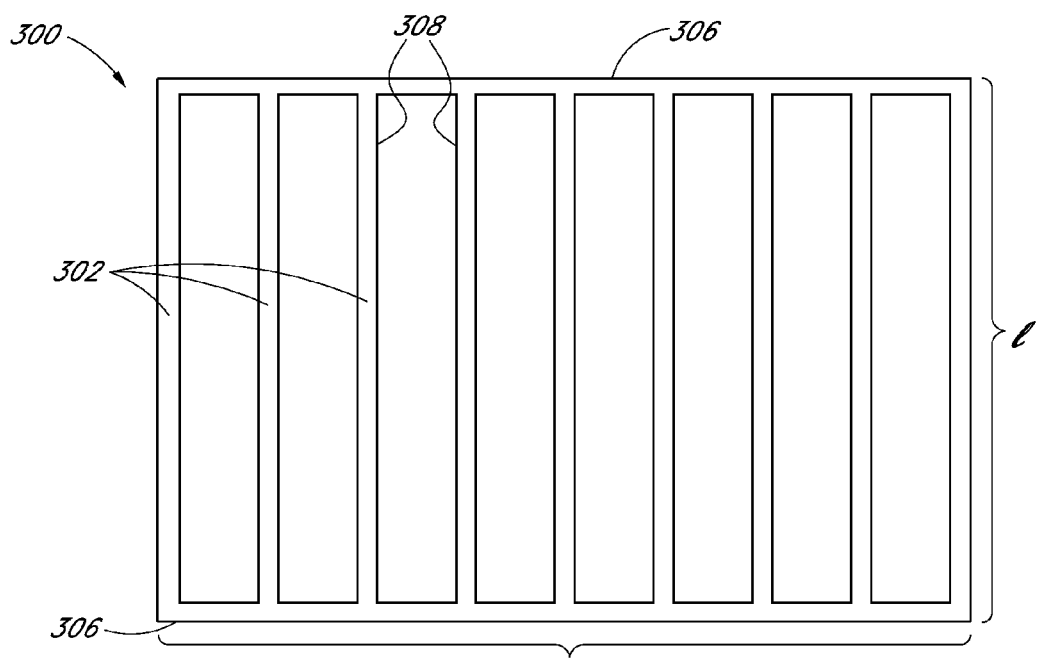
FIG. 12 is a top view of the sag-bending glass mold of FIG. 11.

FIG. 12 illustrates a further advantage of joining linear square root composite shapes to form a mold, such as mold 300. As compared to the mold 100 of FIG. 3, it can be seen that by joining multiple curved sections, the length/of the mold 300 is increased to at least double that of mold 100 in FIG. 3. Accordingly, for a constant width w, it can be seen that the aspect ratio decreases from that of FIG. 3, which was about 3:1 to about 1.5:1, or, where the width w is varied, to any other aspect ratio of 2:1, 1.6:1, 1.15:1, or even less than one. For example, with reference to FIGS. 18-20, it can be seen that molds with aspect rations much less than 1 can be formed.

FIGS. 13-17 illustrates a mold 400 for sag-bending glass to a particular shape. Unless otherwise indicated, the numerical indicators in FIGS. 13-17 designate components and features similar to those in FIGS. 10-12, except that they have been incremented by 100. The mold 400 can be a perimeter-supported mold for sag-bending planar or flat glass sheets, such as sheet 450. Sheet 450 can have a midpoint 452, dividing the sheet 450 into first side 454 and second side 456. The sheet 450 can have a lower surface 460.

Figure 13:
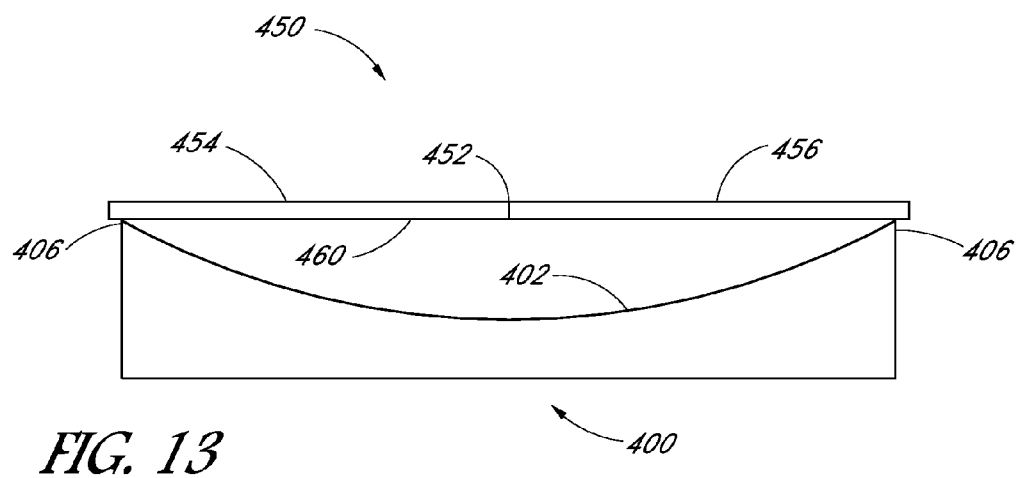
FIG. 13 is a side view of a sag-bending glass mold having a linear-square root composite shape with associated glass sheet.
Figure 14:
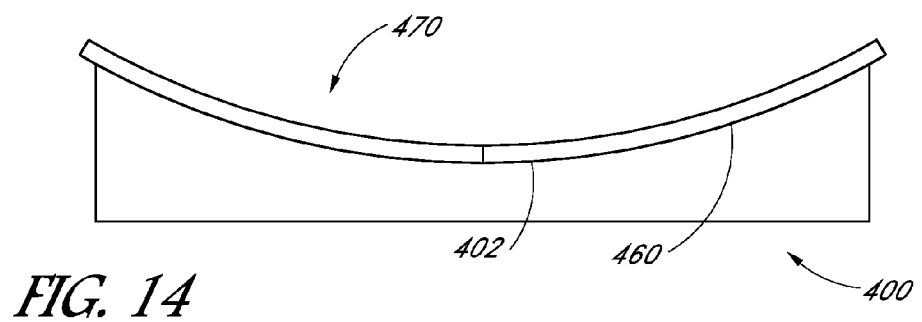
FIG. 14 is a side view of the sag-bending glass mold of FIG. 13 forming the glass sheet into a partial-parabolic shape.

During preparation for sag-bending the sheet 450, the sheet 450 can be positioned on or above the upper surface 402 of the mold 400, as depicted in FIG. 13. In FIG. 14, the sheet 450 has been replaced with curved sheet 470, formed by heating the sheet 450 until it reaches a temperature sufficient to sag the glass mirror sheet to deform downwards toward the upper surface 402 of the mold 400. The mold 400 can then support the lower surface 460 of the sheet with its upper surface 402, molding the glass sheet 450 to the desired shape as curved sheet 470. In certain embodiments, a downward force can be imparted to sheet 450 to cause it to curve to follow upper surface 402. Such a force can be caused by a press from above the sheet 450 directed downward and forcing the sheet 450 into the mold 400. Alternatively, the mold 400 can incorporate one or more vacuum ports which draw the sheet 450 downward toward and onto the upper surface 402 of the mold 400.

Figure 15A:
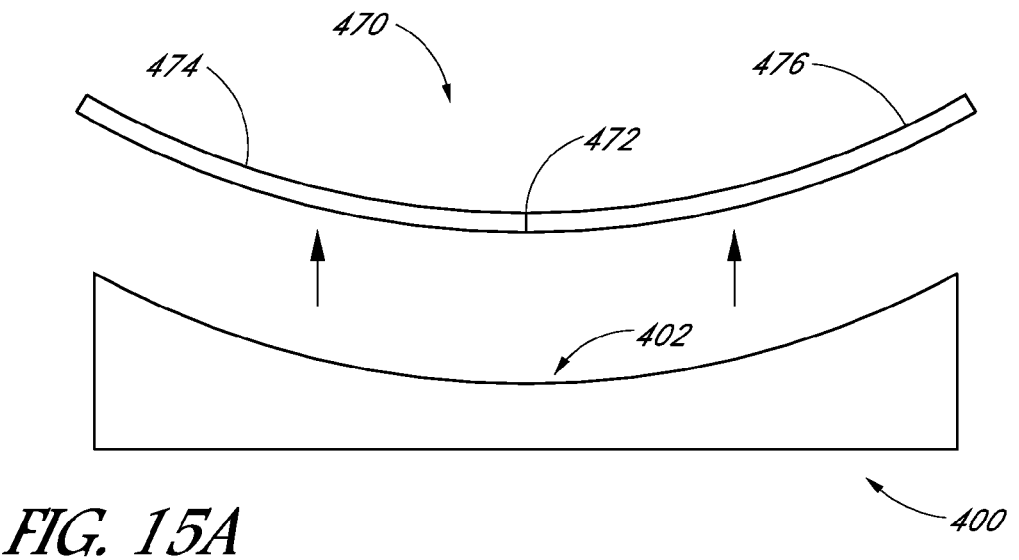
FIG. 15A is a side view of the sag-bending glass mold of FIG. 14 with the shaped glass sheet removed.
Figure 15B:
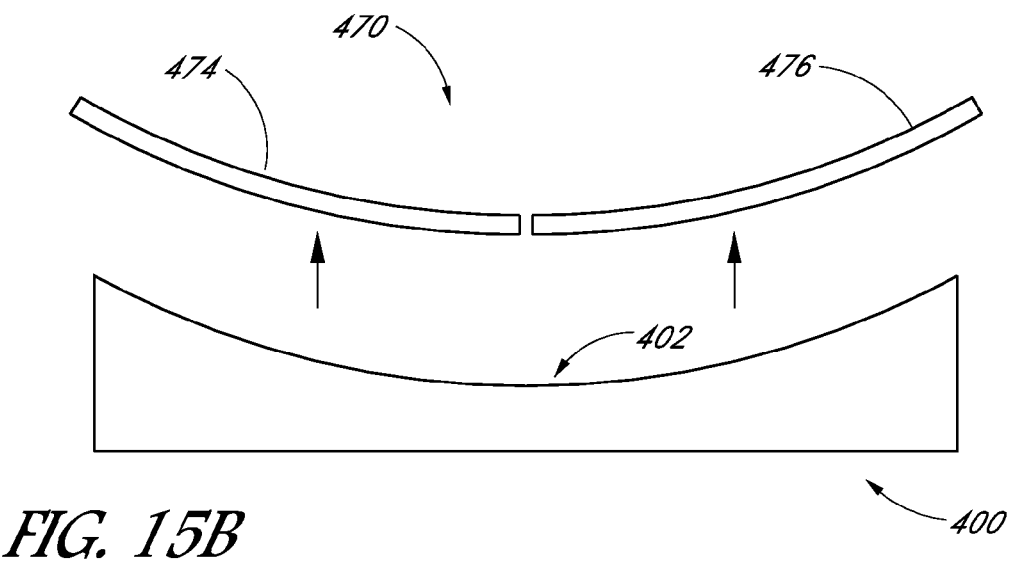
FIG. 15B is a side view of the sag-bending glass mold of FIG. 15A with the shaped glass sheet separated.

After shaping the sheet 450 into the curved sheet 470, the curved sheet 470 can be separated from the mold 400, as shown in FIG. 15A. In certain embodiments, the curved sheet 470 can be separated, cut, or divided at its midpoint 472 as shown in FIG. 15B. As shown, the curved sheet 470 is thus divided into first section 474 and second section 476, each of which can have a partial parabolic shape, despite the linear square root composite curved shape of the upper surface 402 against which it is formed. In certain embodiments, the mold 400 can include a flat portion between partial parabolic shapes, such as near the middle of the mold 400 to provide material between the two sections for kerf, although such a flat portion is desirably minimized to inhibit waste material.

With additional reference again to FIG. 12, it should be understood that the increase in length/is greater than that caused simply by doubling the curved upper surface. The rotation of the curved portion 212 of FIG. 6 which, as can be seen in FIG. 6 extends further along the x axis than the parabolic portion 202, causes portion 212 to overlie the x axis to a greater extent than portion 202. Although both portions produce the same partial parabolic shape from the same area of glass sheet, the non-parabolic curve of mold 300 does so with less vertical bending, increasing accuracy and manufacturability.

Figure 16:
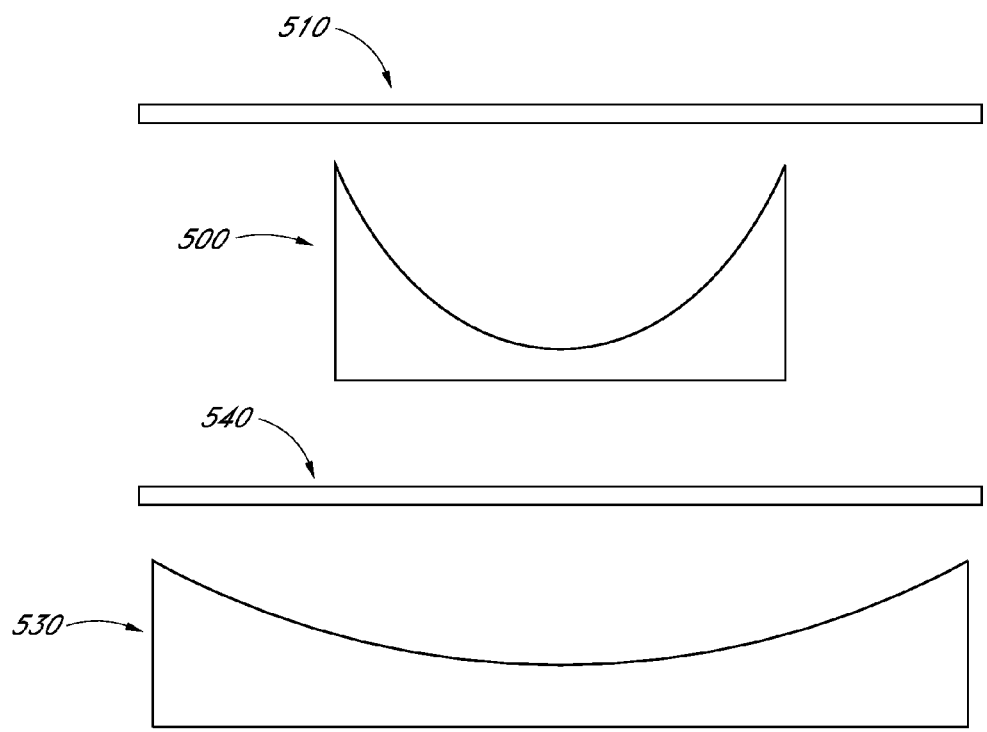
FIG. 16 is a side view of embodiments of two sag-bending molds with adjacent glass sheets.
Figure 17:
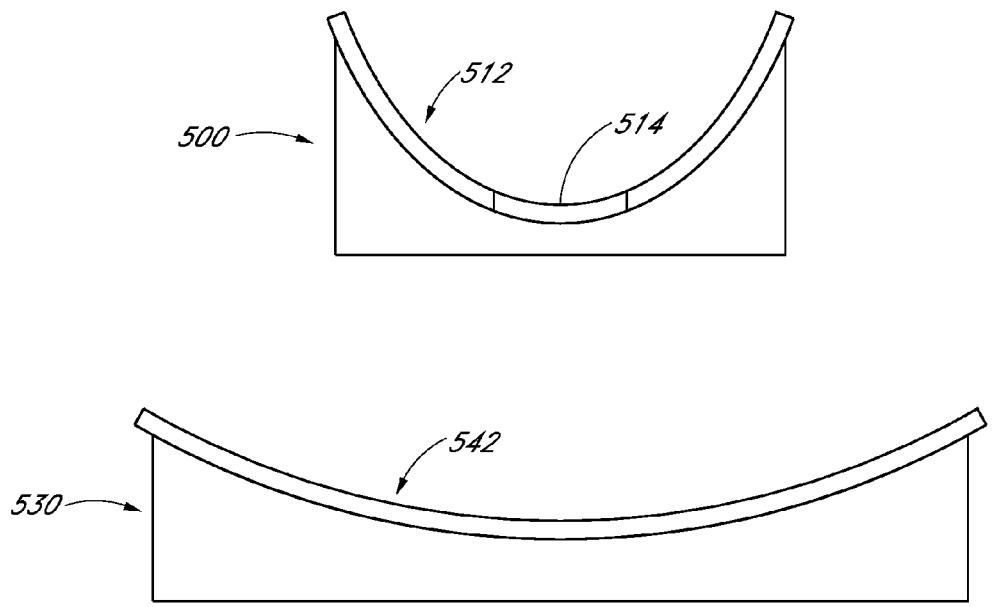
FIG. 17 is a side view of the embodiments of FIG. 16 after sag-bending the adjacent glass sheets.
Figure 21:
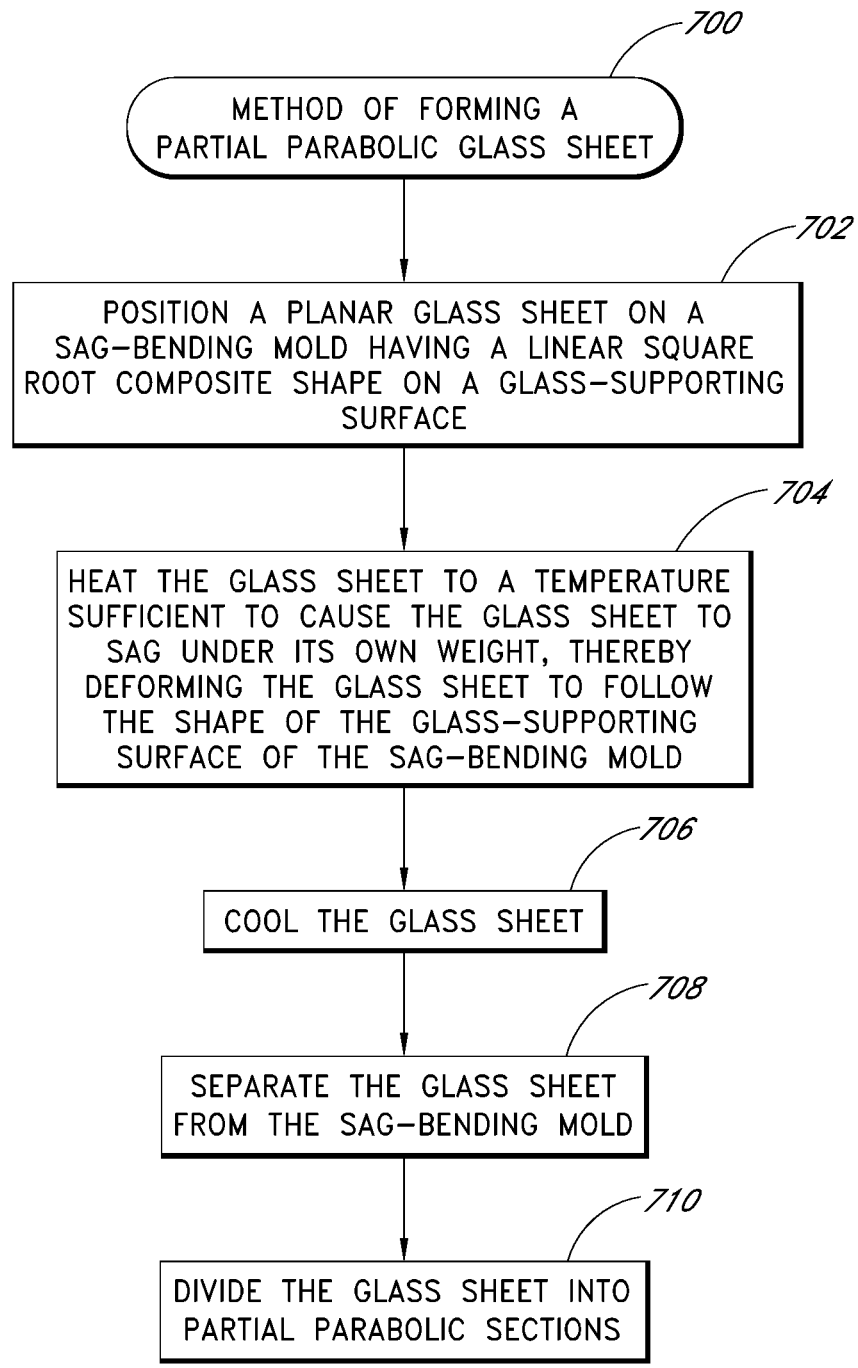
FIG. 21 is an illustration of a method for forming a partial parabolic glass sheet.

FIG. 16 further illustrates the advantage to aspect ratio caused by the use of a linear square root composite curve shape on a sag-bending mold. As can be seen in the cross-sections illustrated in FIGS. 16 and 17, a mold 500, which is a double-sided parabolic glass mold, has a greater vertical deformation distance and lesser horizontal deformation range. By contrast, another embodiment of a mold 530, which is a double-sided linear square root composite curve shape similar to those shapes illustrated in FIGS. 7 and 8, has a greater horizontal deformation range and lesser vertical deformation distance. Both molds 500, 530, however, form similarly long glass sheets 510 and 540 respectively. As can be seen with reference to FIG. 17, the glass sheets 510 and 540 have been formed into curved sheets 512, 542 respectively. As shown above, if each glass sheet 512, 542 is separated at its midpoint, and waste region 514 removed, they will form substantially identical partial parabolic shapes.

The glass sheet 542 formed by mold 530, if separated at or near the midpoint, however, is formed by a greatly advantageous process. Because the mold 530 uses a linear square root composite shape for its molding surface, the aspect ratio is superior to the parabolic shape of mold 500, permitting for easier sagging at a lower temperature. Additionally, because there is less vertical deformation when mold 530 is used, localized deformation effects are inhibited or eliminated, thereby increasing glass quality and ultimately solar system performance. Further, waste region 514 of curved sheet 512 is the region between partial parabolic portions, as can be understood by reference to FIG. 5 and the space between the origin and point $A_0$ in the figure. The waste region 514 extends on both sides of the mold 500, causing waste glass to be cut from the curved sheet 512. Thus, while glass sheets 510, 540 appear to be of equal length, sheet 510 is in fact slightly longer to account for the waste region 514. The reduced waste enabled by using a linear square root composite shaped sag-bending mold further contributes to its cost superiority.

FIG. 18 illustrates another embodiment of a sag-bending mold 600. As can be seen, a single mold 600 can comprise several sections, such as first section 602 and second section 604, for forming partial parabolic curves using a linear square root composite shaped upper surface. Although a shape similar to that of FIG. 7 is shown repeated longitudinally, approximating a wave-like shape, other shapes can also be used or intermixed. For example, in another embodiment, the first section 602 can correspond to a shape similar to that of FIG. 7, while the second section 604 can correspond to a shape similar to FIG. 9. In certain embodiments, only two such sections are joined, while in other embodiments, three, four, five, or any practical number of such sections can be formed into a single mold.

In certain embodiments, a transition surface can be present between joined sections to provide a gradual curvature section, if desired. For example, in certain embodiments, there can be a flat portion 606 on the upper surface of mold 600 between sections 602 and 604. As stated above, the flat portion 606 can be minimized to inhibit waste glass.

After forming a glass sheet using a mold similar to that shown in FIG. 18, or described in reference thereto, the glass sheet can be separated, divided, or cut into the correct number of partial parabolic glass shapes. Thus, while two such shapes may be formed by the mold illustrated in FIGS. 13-15, and FIG. 18 illustrates a mold which may produce at least four such partial parabolic portions, other molds can produce six, seven, twelve, or any number of partial parabolic portions depending on how many linear square root composite shaped portions are joined.

FIG. 19 illustrates another embodiment of a mold similar to that of FIG. 18, except that mold 620 is formed with four joined linear square root composite shaped portions. Portion 622 can correspond to a linear square root composite curve portion similar to portion 212 of FIG. 7, whereas portion 624 can correspond to portion 222 of FIG. 7. Portion 626, however, can correspond to portion 212 of FIG. 9, except that it has been rotated to join with portion 622 with a slope matching the slope of portion 622 at the intersection therebetween. In other words, portions 622 and 626 are joined as a smooth curve where they have a common tangent direction at the joining. Similarly, portion 628 has been oriented to be smoothly joined with portion 624. A single mold such as mold 620 can thus be used to create four partial parabolic glass shapes which can be separated by dividing them, such as by cutting, at the location of portion joins.

FIG. 20 illustrates another embodiment of a mold 630 similar to that of mold 620 except that portion 632 corresponds to portion 212 of FIG. 8, and portion 634 corresponds to portion 222 of FIG. 8. Portions 636 and 638 can be joined to their respective portions 632, 634 in a manner similar to that described above with respect to FIG. 19.

As can be seen, various other portions can be joined similarly to make other permutations. So long as the linear square root composite curved portions are joined smoothly as shown, or with a transition portion permitting a smooth joining, numerous possibilities for molds can be constructed. Additionally, more than four portions can be joined, and permutations of multiple-portion molds can be themselves smoothly joined to form molds which can produce any number of portions, even or odd, as desired for the embodiment. Thus, while two- and four-portion molds are shown, three-portion molds, eight-portion molds, or seventeen-portion molds, together with any other number, can all be formed using the techniques and advances described herein.

For illustrative purposes, the following description of method 700 may refer to elements mentioned above in connection with FIGS. 1-18. In practice, portions of method 700 may be performed by different elements of the described system, e.g., mold 300, upper surface 302, or any other component, whether or not illustrated. It should be appreciated that method can include any number of additional or alternative tasks, the tasks shown in FIG. 19 need not be performed in the illustrated order, and method 700 may be incorporated into a more comprehensive procedure or process having additional functionality not described in detail herein.

Method 700 describes a method of forming a partial parabolic glass sheet, from a flat or planar glass sheet or curved into the desired shape. Initially, a planar glass sheet can be positioned on or above a sag-bending mold having a linear square root composite shape on an upper, glass-supporting surface 702. Subsequently, the glass sheet can be heated to a first temperature 704. The first temperature can be sufficient to cause the glass sheet to sag under its own weight or, in some embodiments, a downward force additionally can be applied. In either case, the planar glass sheet can be caused to deform to follow the shape of the glass-supporting surface of the sag-bending mold.

The curved glass sheet can then be cooled below the first temperature 706. The cooling can be sufficient to harden the glass and ensure that it will retain its shape once removed from the mold. The curved glass sheet can then be removed from the mold 708. In certain embodiments, the curved glass sheet can be removed once only partially cooled to its final rest temperature. In other embodiments, the curved glass sheet can be cooled entirely to its final rest temperature before separating the curved glass sheet from the mold. The curved glass sheet can now be in the shape of a partial parabola appropriate for use in a solar concentrator or other application.

The curved glass sheet, after separated from the sag-bending mold, can optionally be divided or separated into discrete partial parabolic portions, sections, or segments. As described above, a single mold having a linear square root composite curve shape can be used to form several partial parabolic portions from a single planar glass sheet, advantageously with less localized defects and greater throughput than a parabolic mold.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for forming a partial parabolic glass sheet, the method comprising:
    positioning a planar glass sheet on a sag-bending mold having a linear-square root composite shape for substantially the entire sag-bending mold; and
    deforming substantially all of the glass sheet to follow the linear-square root composite shape of the sag-bending mold.

2. The method of claim 1, wherein deforming the glass sheet comprises heating the planar glass sheet to at least a first temperature, wherein the first temperature is sufficient to cause the glass sheet to sag under its own weight.

3. The method of claim 2, further comprising maintaining the planar glass at the first temperature until the glass sheet has deformed to follow the linear-square root composite shape of the sag-bending mold.

4. The method of claim 2, further comprising imparting a downward force to the glass sheet.

5. The method of claim 1, further comprising separating the glass sheet into a plurality of sections, each section having a partial parabolic glass shape.

6. The method of claim 1, wherein the glass sheet has an aspect ratio of 2:1 or smaller.

7. A method for forming a glass sheet having a partial parabolic shape, the method comprising:
    positioning a planar glass sheet on a sag-bending mold having an upper surface with a non-parabolic linear-square root composite shape for substantially the entire sag-bending mold;
    deforming substantially all of the glass sheet to contact the non-parabolic upper surface of the sag-bending mold; and
    separating the glass sheet from the sag-bending mold.

8. The method of claim 7, wherein deforming the glass sheet comprises heating the glass sheet, thereby causing the glass sheet to sag to the linear-square root composite shape of the upper surface of the sag-bending mold.

9. The method of claim 8, further comprising cooling the glass sheet.

10. The method of claim 7 further comprising removing the glass sheet from the sag-bending mold.

11. The method of claim 7 further comprising separating the glass sheet into at least two sections, each section having a partial parabolic shape.

12. The method of claim 7, wherein deforming the glass sheet to contact the non-parabolic upper surface of the sag-bending mold comprises forming the glass sheet into at least one partial parabolic shape.

* * * * *